United States Patent [19]

Darmon

[11] Patent Number: 4,718,292

[45] Date of Patent: Jan. 12, 1988

[54] MECHANISM FOR GUIDING AN ELEMENT PARALLEL TO ITSELF

[76] Inventor: Michel Darmon, 68 boulevard Pasteur, 75015 Paris, France

[21] Appl. No.: 722,982

[22] Filed: Apr. 15, 1985

[30] Foreign Application Priority Data

Apr. 13, 1984 [FR] France .................. 84 05901

[51] Int. Cl.$^4$ ............ F16H 21/44; F16H 21/52
[52] U.S. Cl. ............................ 74/103; 74/521
[58] Field of Search ............ 74/103, 101, 520, 521; 173/38; 248/277, 280.1, 281.1, 421

[56] References Cited

U.S. PATENT DOCUMENTS

| 1,707,764 | 4/1929 | Mattison | 248/277 |
|---|---|---|---|
| 1,779,827 | 10/1930 | Reed | 248/277 |
| 2,156,148 | 4/1939 | Giacomo et al. | 248/421 |
| 2,549,562 | 4/1951 | Baker . | |
| 2,551,130 | 5/1951 | Hunt et al. . | |
| 2,560,466 | 7/1951 | Meinke | 248/277 |
| 3,195,656 | 7/1965 | Johnson et al. | 74/103 |
| 3,312,980 | 4/1967 | Erbach . | |
| 3,426,994 | 2/1969 | Daniel, Jr. . | |
| 3,484,004 | 12/1969 | Hughey . | |
| 3,501,120 | 3/1970 | Daniel, Jr. . | |
| 3,703,968 | 11/1972 | Uhrich et al. . | |
| 4,041,799 | 8/1977 | Teti | 74/521 |
| 4,059,141 | 11/1977 | Hutton . | |
| 4,221,079 | 9/1980 | Becker | 49/351 |
| 4,249,427 | 2/1981 | Colinet et al. . | |

FOREIGN PATENT DOCUMENTS

| 0021171 | 1/1981 | European Pat. Off. . |
| 2348354 | 11/1977 | France . |
| 2055754 | 3/1981 | United Kingdom . |

OTHER PUBLICATIONS

"Motion Geometry of Mechanisms"; E. A. Dijksman; Cambridge University Press, pp. 102–123 and 158–160.
"Tragheitswirkungen an verschiedenen Ausfuhrungsformen des Hookeschen Schlussels", *Feinwerktechnik*, vol. 65, No. 10, Oct. 1961, W. Rath, pp. 359–363.
"Type and Mobility Analysis of the Spherical Four--Link Mechanism" C87/72; M. J. Gilmartin et al. *Mecanism 72. Institution of Mechanical Engineers*, pp. 90–97.
"Gertriebebeispiel Atlas" K. Hain, VDI Verlag, paragraphs 3.1.1, 3.1.5, 4.1.1., 10.1.2., 10.1.5, 10.1.6, 10.2.3, 10.2.4, 10.3.1.
"Mechanisms, Linkages, and Mechanical Controls"; Nicholas Chironis, McGraw–Hill Book Company, New York, San Francisco, Toronto, London and Sydney; pp. 72–77.
"Straight–Line Linkages", Machine Design, vol. 22, Jan. 1950; H. G. Conway; pp. 90–92.
"Koppelkurvenatlas als Mittel zur Konstruktionsvereinfachung"; *VDI–Berichte*, vol. 29; 1958, J. Volmer; pp. 103–108.
"On a Class of Spherical Linkages"; *Abstracts of Papers Presented at ASME Meetings*, vol. 90, No. 11; Nov. 1968, F. Y. Chen; p. 68.
"Geometrical Considerations on Space Kinematics in Connection with Bennett's Mechanism"; B. Groeneveld; La Haye (NL).

*Primary Examiner*—Lawrence J. Staab
*Attorney, Agent, or Firm*—Young & Thompson

[57] ABSTRACT

The mechanism comprises a movable part having one main point actuated by a crank, another main point guided along a slide having a desired profile, and a driven point which follows a desired path, depending upon the path of the two main points. A driven member is articulated to the movable member about the driven point. Moreover, the driven member is guided with respect to the crank along a path which is in a certain similarity with respect to the path of said other main point. The driven member moves parallel to itself when the crank is actuated.

1 Claim, 8 Drawing Figures

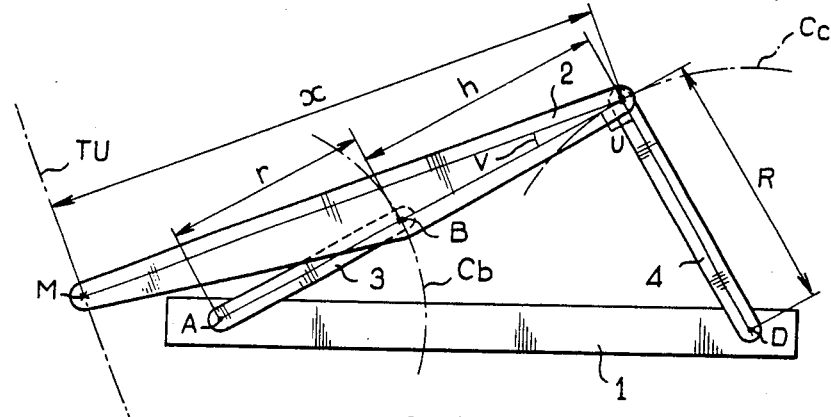
FIG_1
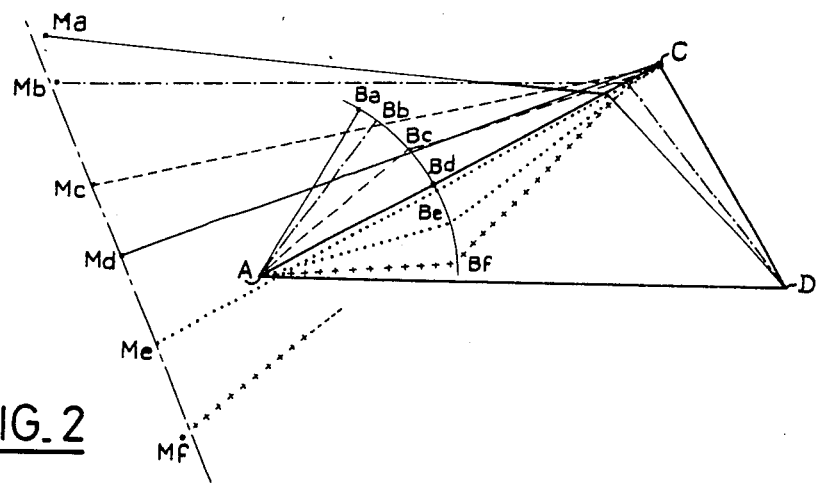
FIG_2
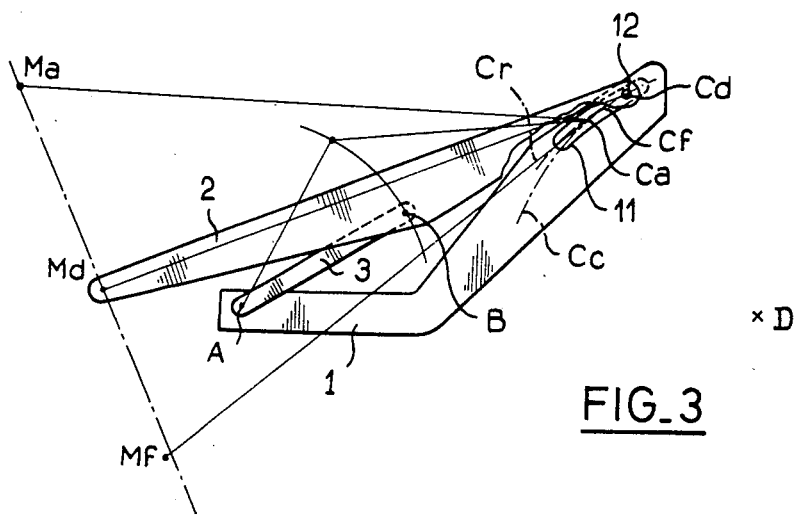
FIG_3

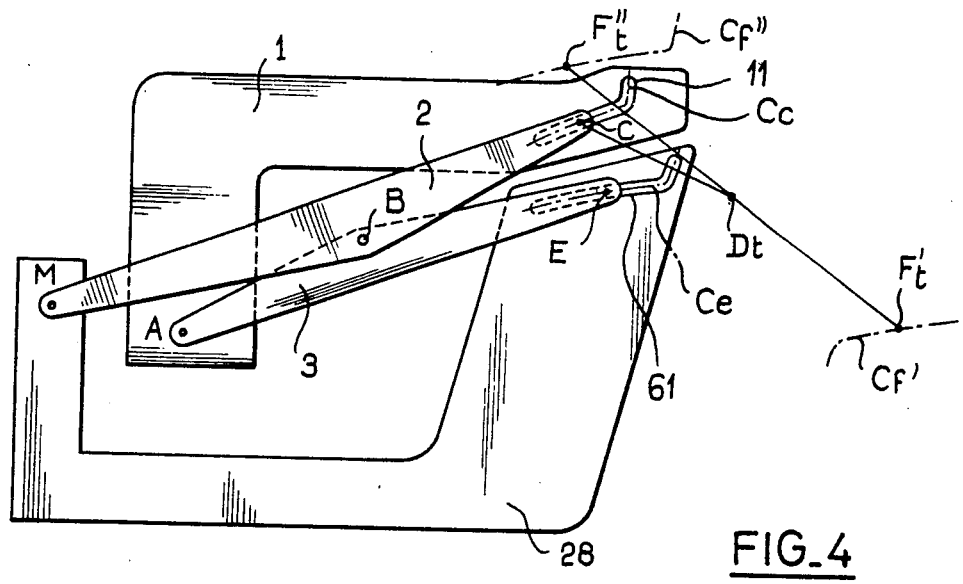
FIG_4
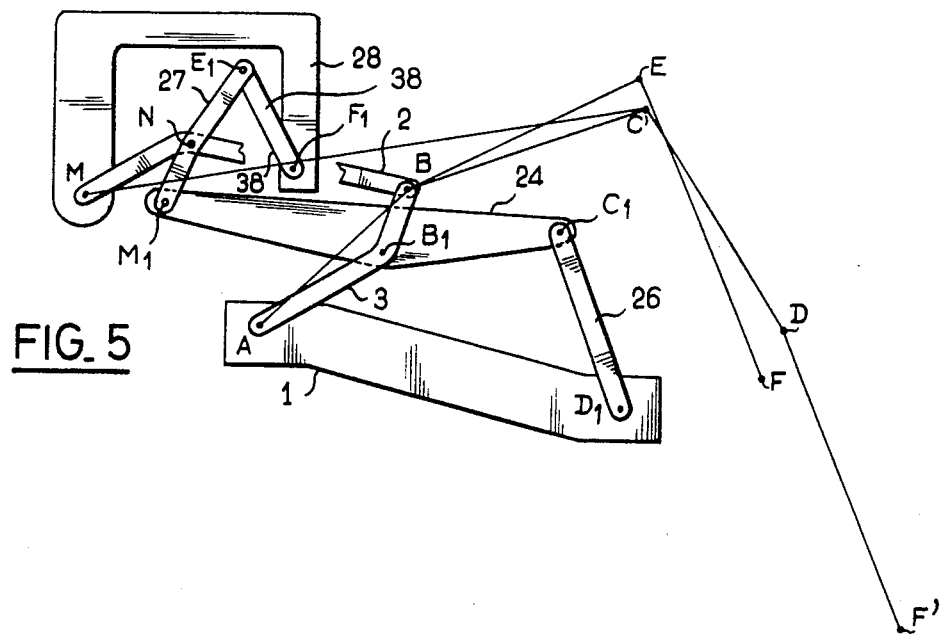
FIG_5

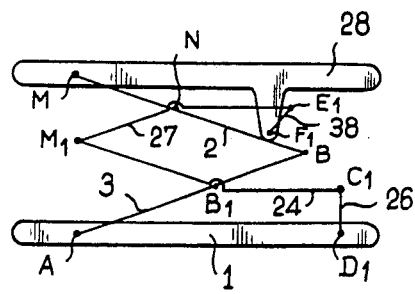
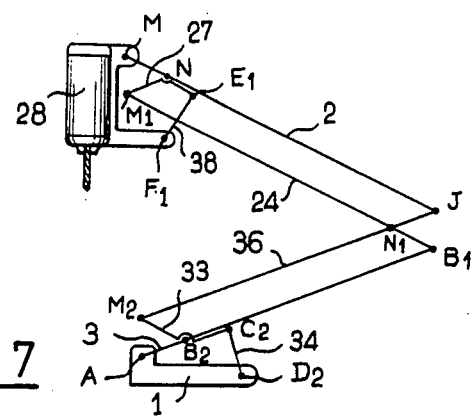
FIG_6
FIG_7
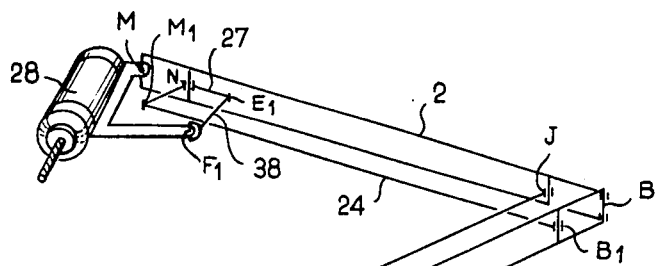
FIG_8

MECHANISM FOR GUIDING AN ELEMENT PARALLEL TO ITSELF

This invention relates to mechanisms for guiding an element parallel to itself without the use of slotted guides or slides having a corresponding length.

According to the invention, the guide mechanism comprises a carrier member, a movable member to which a driven point is geometrically linked, a crank bearing a parallelism axis connecting an axis of the carrier member to a first main axis of the movable member to guide said main axis along a first cylinder, guide means guiding a second main axis of the movable member along a second cylinder of having a base which may deviate from any segment of a circle, a driven member, the arrangement being substantially such that a vector having as its origin the parallelism axis and as its end the first main axis, and a vector having as its origin the end of the former and as its end the driven point are respectively equal, except for the same compound factor, to a vector having as its origin the first main axis and as its end the axis of the carrier member and to a vector having as its origin the second main axis and as its end the first main axis, the parallelism axis being guided relatively to the driven member along a cylinder substantially derived, by similarity having as its ratio the said compound factor, from the trajectory along which the said second main axis is guided.

The mechanism according to the invention enables a part to be guided parallel to itself over a trajectory, the line of which may be selected with a considerable degree of freedom depending upon the guidance provided on the second main axis. This guidance may be obtained by a slotted guide or slide without losing the advantages of the invention, because an axis embodied as a pivot is easily guided in a slot and also because it is possible for the arrangement to be such that the maximum movement of the second main axis is short.

Other features and advantages of the invention will be apparent from the following description with reference to the accompanying drawings, which are given by way of example without any limiting force and in which:

FIG. 1 is a plan view of a basic mechanism capable of being a part of the invention.

FIG. 2 is a diagram showing different positions of the mechanism in FIG. 1.

FIG. 3 is a plan view of a variant of the mechanism shown in FIG. 1.

FIG. 4 is a plan view of a mechanism for moving a driven member parallel to itself.

FIG. 5 is a diagram of another embodiment.

FIG. 6 is a diagram in side elevation showing a lifting table using a mechanism similar to that shown in FIG. 5.

FIG. 7 is a diagram in side elevation showing an articulated arm according to the invention and FIG. 8 is a perspective of a variant of the arm shown in FIG. 7.

Referring firstly to FIGS. 1 and 2 it will be shown that it is possible to give a driven point M very advantageous trajectories at the end of a movable member 2, of which two main axes B and C parallel to and separate from one another, and separate from the driven point M, are guided along cylinders Cb and Cc respectively. In the example, the cylinders Cb and Cc are of circular base, guidance being provided by a crank 3 connecting the first main axis B to an axis A of a carrier member 1, and by a crank 4 connecting the second main axis C to an axis D of the carrier member 1.

As will be seen from FIG. 1, the distances between the axes A and B, B and C, C and D, and A and D are so selected that in a reference position in which a main plane PP bearing the main axes B and C also passes through the axis A, the said main plane PP together with the plane passing through the axes C and D forms an angle U oriented from the plane PP towards the plane passing through the axes C and D, the angle U being between 60° and 120° and more particularly exactly 90° in the example illustrated.

Also, the distance x between the driven point M and the second main axis C verifies the equation (1):

$$x = \frac{h}{r}(h+r)\frac{\sin U - V}{\sin U},$$

where:
r denotes the distance between the axes A and B,
h denotes the distance between the two main axes B and C;
V denotes the angle between the main plane PP and a plane passing through the axis C and the driven point M, the angle V being oriented from the plane PP towards the plane passing through the axis C and the point M, and being measured with the same sign rule as U,
r and h are algebraic terms which are of the same sign in the example illustrated, in which the axis B is between the axes A and C in the reference position and would be of opposite sign in the opposite case.
x, on the other hand, has no sign because the oriented angle V already defines the half-line on which the point M is situated with respect to the main plane and to the axis C.

Under these conditions, when the mechanism moves near its reference position, the point M describes a useful trajectory TU very close to a segment of straight a line. The error in the trajectory TU with respect to a perfect straight line is in theory an infinitesimally small one with respect to the length of the trajectory. This mechanism thus enables a point to be made to describe a segment of a straight line, subject to a tolerance compatible with precision engineering without the need for a slide.

If the angle U is made strictly 90°, the equation (1) becomes:

$$x = \frac{h}{r}(h+r)\cos V \qquad (2)$$

In the example illustrated, V is defined by the equation (3):

$$V = -\text{Arc tan}\left[\left(\frac{h}{r} - 1\right)\frac{R}{h+r}\right]$$

This formula is such that when $h/r - 1$ and $h + r$ are of the same sign, the point M defined by x and V and the point D are in the reference position on either side of the main plane PP.

When the mechanism moves near the reference position shown in FIG. 1, the point M then follows a useful trajectory TU which compared with an ideal segment of a straight line has an error which is an infinitesimally small one of order 5 with respect to its length.

FIG. 2 diagrammatically illustrates, by means of different types of line, six positions of the mechanism, from which it will be seen that over an appreciable distance the useful trajectory of the driven point M differs very little from a segment of a line shown in dot-dash form.

FIG. 2 shows that a relatively considerable travel of the driven point M involves only a relatively small travel of the second main axis C. That is why it is possible to reduce the size of the mechanism without any appreciable problem, by replacing crank 4, as shown in FIG. 3, by a profiled slotted guide 11 carried by the carrier member 1 and guiding a cylindrical stud 12, of axis C, secured to the movable member 2. The guide 11 may have a circular profile, the centre-line Cc of which has axis D as its axis and, as its radius, the value R which verifies the formulae (2) and (3), in which case guidance of the driven point M is not affected. In another embodiment, the guide 11 may have a simplified rectilinear profile embodying an approximation of the aforesaid circular profile.

In the embodiment illustrated, the profile of the guide 11 follows a centre-line Cr which, starting from the position Cd of the axis C when the mechanism is in the reference position (solid line in FIG. 3), follows the centre-line Cc over a certain distance and then differs slightly, moving away from the axis D with respect to the line Cc. Thus guidance of the point M is not affected in the positions Mc, Md, Me (FIG. 2) close to the position Md corresponding to the reference position of the mechanism. On the other hand, in the positions Ma, Mb, Mf remote from the position Md, the guide following the centre-line Cr tends to correct the error introduced by strictly circular guidance of the axis C. Surprisingly, as shown by the positions Ma and Mf in FIG. 3, the correction is favourable at the two ends of the trajectory TU.

In this embodiment, the guide 11 being small in relation to the travel of the driven point M, it is possible to give it great mechanical precision without excessively increasing the cost price of the mechanism relative to its performance.

When the crank 4 is replaced by a guide, R represents the radius of curvature thereof in the reference position.

It has therefore been shown that all that is required is a movable member, e.g. 2, guided by at least one crank 3 and by any other guide means, to provide a trajectory which may be very advantageous mechanically. It has been shown how to obtain a rectilinear trajectory for the point M, but of course if the profile of the guide 11 is modified or if the dimension ratios in the mechanism are varied, it is possible to obtain any other trajectory required.

FIG. 4 shows how it is possible to link to point M a driven member 28 moving parallel to itself when M is guided by the mechanism.

In this example, the axis C has been given an arbitrary trajectory Cc and one which, in particular, deviates from an arc of a circle, at least over part of its length.

In this embodiment, which will be described only in respect of its differences from that shown in FIG. 3, the crank 3 bears a parallelism axis E which is guided relatively to member 28 over a cylindrical trajectory Ce. This guidance is provided by a slotted guide 61 carried by the driven member 28.

The position of the axis E is such that the compound factor by which $\overrightarrow{AB}$ has to be multiplied to obtain $\overrightarrow{AE}$ is the same as that by which $\overrightarrow{CB}$ has to be multiplied to obtain $\overrightarrow{CM}$.

Let us consider figures EMB and ABC. They can undergo deformation because of the presence of the guides 11 and 61. Also, two of the sides of each of these figures have the same angular velocity as two respective sides of the other figure. The reason for this is that AB is coupled with BE and MB with BC.

The idea underlying the invention consists in giving the guide 61 a conformation derived from that of the guide 11 so that the vector extending from the axis E to the instantaneous centre of the axis E with respect to the movable member 28 and the vector extending from the axis C to the instantaneous centre of rotation of C with respect to the carrier member 1 are in the same compound ratio as that giving a change from $\overrightarrow{BA}$ to $\overrightarrow{BM}$ or from $\overrightarrow{BC}$ to $\overrightarrow{BE}$. Thus these two vectors, which are not shown, also have the same angular velocity and since their end, for each position of the axis C, is fixed with respect to the carrier member 1, (vector originating from C) and respectively with respect to the driven member 28 (vector originating from E), it follows that on the driven member 28 there is a vector which goes from the driven point M to the instantaneous centre of rotation of the axis E and this vector goes at the same angular velocity as a vector carried by the member 1 and extending from the axis A to the instantaneous centre of rotation of the axis C. This establishes the fact that the carrier member 1 and the driven member 28 have the same angular velocity, in other words, the driven member 28 moves parallel to itself.

In other terms, in each position of the mechanism, the sides of the quadrilateral having as apices ABC and the instantaneous centre of rotation of C each have the same angular velocity as one of the sides of the quadrilateral having as apices EBM and the instantaneous centre of rotation of the axis E with respect to the member 28.

To construct the profile of the guide 61 it is not necessary to calculate the instantaneous centre of rotation of the axis C in each position of the mechanism.

As shown in FIG. 4, it is possible to determine the trajectory Ce with accuracy by choosing an arbitrary theoretical axis $D_t$. There are then constructed a theoretical axis $F_t'$ and a theoretical curve $C_f'$ which are respectively derived from the axis C and the curve Cc by similarity of centre $D_t$ and of identical compound ratio to the similarity of centre B providing the change from $\overrightarrow{BC}$ to $\overrightarrow{BM}$. There are then determined the theoretical axis $F_t''$ and a curve $C_f''$ from the theoretical axis $F_t'$ and the curve $C_f'$ by symmetry of centre $D_t$. The curve Ce is determined from the curve $C_f''$ by translation providing the change from $F_t''$ to E.

The embodiment shown in FIG. 5 enables a driven point M to be given a considerable travel relatively to the size of the mechanism.

In this example, the movable member 2 remains guided in such a manner that two main axes B and C connected to said member follow defined cylinders, of circular base in the example, centred on axes A and D respectively, connected to the carrier member 1. However, the movable member 2 does not extend as far as the geoemtric axis C and the carrier member 1 does not extend as far as the axis D.

The crank 3 bears a first main intermediate axis Bl by which it is articulated to an intermediate member 24 of which a second main intermediate axis C1 is guided along a cylindrical trajectory of circular base about an axis D1 connected to the carrier member 1. In the example illustrated these guide means comprise a crank 26 articulated on the axes C1 and D1 with the members 24 and 1 respectively. The intermediate member 24 carries an intermediate driven point M1.

The distance between the axes A and B1 is less than the distance between the axes A and B. The angle between the segments AB, AB1 is selected arbitrarily. Also, the relative arrangement of the axes A, B1, C1 and D1 with respect to one another and of the point M1 with respect to the axes B1 and C1 is such that the system formed by the cranks 3 and 26 and the intermediate member 24 is derived from the system A, B, C, D required to guide the driven point M along the required trajectory TU, by a similarity the centre of which is on axis A and the compound ratio of which is that by which the vector $\overrightarrow{AB}$ has to be multiplied to obtain the vector $\overrightarrow{AB1}$. The intermediate driven point M1 satisfies the equation (1) and even in the example illustrated the equations (2) and (3) relatively to the axes A, B1, C1, D1 and therefore follows a substantially rectilinear useful trajectory when the intermediate member 24 moves near its reference position.

The intermediate member 24 is connected to the movable member 2 by a link 27 articulated to the member 24 along an axis passing through the intermediate driven point M1 and to the movable member along an axis N so positioned that the vector $\overrightarrow{M1N}$ is equal to (equipollent with) the vector $\overrightarrow{B1B}$.

As a result of this deformable parallelogram link (2, 24, 3, 27), the movable member 2 always has the same angular velocity as the intermediate member 24. Since the latter is so guided as to have two geometric axes B1, C1 describing cylindrical trajectories, the movable member 2 is thus definitely guided so as to have two geometric axes B, C describing cylindrical trajectories similar to those of the axes B1 and C1 and therefore has a point M which satisifes the equations (2) and (3) with respect to the axes A, B, C and D, the axes C and D not being materialized but having a well-defined position with respect to the members 2 and 1 respectively.

Point M can be found by geometric construction from the axes A, B, C, D. However, a simple geometric demonstration will show that $\overrightarrow{BM}$ is derived from $\overrightarrow{BN}$ by a similarity of centre B and of the same ratio as that of the centre A taking $\overrightarrow{AB1}$ to $\overrightarrow{AB}$; this method of determination avoids the need to determine the position of the non-materialized axes C and D.

The useful trajectory of the driven point M is derived from that of the point M1 by similarity of centre A providing the change from $\overrightarrow{AB1}$ to $\overrightarrow{AB}$. Since the modulus of $\overrightarrow{AB}$ is greater than that of $\overrightarrow{AB1}$, the trajectory TU of the driven point M is greater than that of the driven point M1.

In order to drive the driven member 28 parallel to itself while the movable member 2 is driven through a booster stage, the crank 3 could be enlarged as far as an axis E, which would be guided with respect to member 28 by a crank EF which can be deducted from CD according to the similarity, according to FIG. 4, between the paths of C and E with respect to members 1 and 28 respectively. However, an arranoement of this kind would largely lose the advantage of a small size resulting from the use of booster stages.

It has been found according to the invention that it is possible to drive the driven member 28 parallel to itself by continuing the link 27 as far as a parallelism axis E1 where it is articulated to a parallelism link 38 itself articulated to the driven member 28 at a secondary driven axis F1.

The position of the axis E1 is so determined that the compound ratio by which $\overrightarrow{M1N}$ has to be multiplied to obtain $\overrightarrow{M1E1}$ is the same as that by which C1B1 has to be multiplied to obtain $\overrightarrow{C1M1}$. Also, F1 is so selected that the compound factor n by which it is necessary to multiply the vector $\overrightarrow{FE}$ defined with respect to the axes A, B, C, D as stated above to obtain F1E1 is the same as that by which AB has to be multiplied to obtain $\overrightarrow{B1B}$. C1 and D1. The reason for this is that EF is in a fixed compound ratio to $\overrightarrow{CD}$ which is in a fixed compound ratio with respect to $\overrightarrow{C1D1}$. There is therefore a fixed compound ratio between $\overrightarrow{E1F1}$ and $\overrightarrow{C1D1}$.

FIG. 5 shows that the parallelism means 27, 38 are only small in size, while they would be much larger if member 28 were to reach the theoretical axis F.

FIG. 6 diagrammatically shows the application of the mechanism according to FIG. 5 to the construction of a lifting platform. The carrier member 1 is a fixed base, while the driven member 28 comprises a table, the rest of the mechanism being situated between these two elements.

The example of FIG. 7 shows that the use of a number of booster stages enables the mechanism to be given advantageous conformations. In this example, an articulated arm whose carrier member 1 is adapted to be secured to a support is made from two booster stages.

In the example shown in FIG. 7, the intermediate member 24 instead of being guided directly by cranks 3 and 26 so that two of its axes B1 and C1 follow circular trajectories is in turn guided by an arrangement similar to that used for guiding the movable member 2 in FIG. 5. This system comprises a second intermediate member 33 of which a first intermediate main axis B2 and a second intermediate main axis C2 are guided along cylindrical trajectories respectively by the crank 3 and a crank 34 which are articulated on the carrier member 1 at A and D2 respectively.

The intermediate members 24 and 33 form the two opposite sides of a deformable parallelogram also comprising the crank 3 and a link 36.

As in the embodiment shown in FIG. 5, the intermediate member 24 and the movable member 2 form the two opposite sides of a deformable parallelogram link, a third side of which is formed by the link 27 and a fourth side by the link 36 which has a third axis J for its articulation with the movable member 2.

In this embodiment, none of the main axes B and C of the movable member 2 is embodied mechanically, but it is certain that these axes exist according to the arrangement made and it is possible to find the driven point M. To this end, the intermediate driven point M1 connected to the member 24 is determined by the method used in the example shown in FIG. 5 to determine the driven point M and the axes B and C from the position of the axes B1, C1, D1, whereafter the method is applied a second time to find the driven point M from the intermediate driven point M1.

Also, a driven member 28, e.g. a drilling machine whose axis is parallel to the trajectory TU, is articulated to the movable member 2 along an axis passing through the driven point M. The link 27 is articulated by an axis E1 with a parallelism link 38 articulated at F1 to the driven member 28.

The position of the parallelism axis E1 is so defined that the compound factor by which $\overrightarrow{M1N}$ has to be multiplied to obtain $\overrightarrow{M1E1}$ is equal to the complex factor by which $\overrightarrow{C_2B_2}$ has to be multiplied to obtain $\overrightarrow{C_2M_2}$; the position of the axis $F_1$ is so defined that the compound number by which $\overrightarrow{ME_1}$ has to be multiplied to obtain $\overrightarrow{MF_1}$ is the same as that by which $\overrightarrow{AC_2}$ has to be multiplied to obtain $\overrightarrow{AD_2}$. In fact, if we consider the deformable quadrilaterals AB2C2D2 and MNE1F1, there is between A and C2 on the one hand and between M and E1 on the other hand a sum of two vectors which is the same except for a compound factor, and $\overrightarrow{C_2D_2}$ and $\overrightarrow{E_1F_1}$ are moreover equal except for the same factor.

The driven member 28 could also comprise any type of device: a lamp, some other machine tool, e.g. a milling cutter, a liftable nacelle, and so on.

In the example shown in FIG. 7, the members 3, M2N1J, 24 and 2 all operate in flexure for they each have three axes of articulation. The example shown in FIG. 8, which obviates this disadvantage, is identical to that of FIG. 7 except that the articulation N1 is replaced by an articulation between the parts 2 and 3 along the main axis B of the movable member 2, which is such that B, B1, N1, J are at the apices of a parallelogram. The articulation N1 is no longer materialized, so that the parts M2J and 24 are no longer subject to flexural stress and, as shown, can be of reduced weight with respect to the parts 2 and 3. It will be seen that the axis B is common to the two deformable parallelograms of the two booster stages, and similarly as from axis B a part of the member 2 and of the crank 3 is common to the two parallelograms.

I claim:

1. A mechanism for guiding a driven member parallel to itself comprising:
   a first articulated loop comprising in series in the following order:
     a carrier member (1);
     a first crank member (AB2);
     a first movable member (B2C2); and
     a first guiding means (34) for guiding a pivotal connection (C2) of said first movable member (B2C2) along a first given path with respect to the carrier member (1);
   a second articulated loop comprising in series in the following order:
     a driven member (28);
     a second movable member (MN);
     a second crank (NE1); and
     a second guiding means (38) for guiding a pivotal connection (E1) of said second crank (NE1) along a second given path with respect to the driven member (28);
   an intermediate articulated linkage assembly of the deformable parallelogram type comprising:
     a first input member (B1B2) rigidly connected to the first crank (AB2);
     a first output member (M1N) mounted for displacement parallel to the first input member (B1B2) and rigidly connected to the second crank (NE1);
     a second input member (B2M2) rigidly connected to the first movable member (B2C2), and
     a second output member (JN) mounted for displacement parallel to the second input member (B2M2), and rigidly connected to the second movable member (MN);
   wherein the first articulated loop and the second articulated loop are substantially in a geometrical similarity in which the carrier member corresponds to the driven member, the first crank corresponds to the second crank, the first movable member corresponds to the second movable member, and the first guiding means corresponds to the second guiding means;
   said mechanism providing an articulated arm, in which the intermediate articulated linkage assembly comprises two elongated individual parallelogram linkage units in which relatively long sides of each one of the individual parallelogram linkage units are angularly coupled to relatively short sides of the other, the carrier member (1) being adapted to be secured to a support while the driven member (28) carries a device which is movable while remaining parallel to itself irrespective of the state of extension of the arm over a predetermined range.

* * * * *